United States Patent [19]

Shioda et al.

[11] 4,439,027
[45] Mar. 27, 1984

[54] REAR PROJECTION APPARATUS

[75] Inventors: Takizo Shioda; Norio Ito, both of Tokyo; Hiroshi Horiuchi, Yokohama, all of Japan

[73] Assignee: Sony Corporation, Tokyo, Japan

[21] Appl. No.: 444,231

[22] Filed: Nov. 24, 1982

[30] Foreign Application Priority Data

Nov. 26, 1981 [JP] Japan .................... 56-175582[U]

[51] Int. Cl.³ .................... G03B 21/28; H04N 5/74
[52] U.S. Cl. .................... 353/77; 353/38; 353/101; 350/128; 358/237
[58] Field of Search .................... 353/38, 74, 77, 78, 353/72, 73, 100, 101; 350/452, 436, 117–129; 362/339; 358/237, 238, 250, 254, 230, 231

[56] References Cited

U.S. PATENT DOCUMENTS

| 1,475,806 | 11/1923 | Elliot | 362/339 |
|---|---|---|---|
| 2,480,031 | 8/1949 | Kellogg | 350/452 X |
| 2,489,835 | 11/1949 | Traub | 353/78 X |
| 2,800,054 | 7/1957 | Allison | 353/38 |
| 3,319,517 | 5/1967 | Rondas et al. | 353/78 X |
| 3,848,980 | 11/1974 | Plummer | 353/77 X |
| 4,136,935 | 1/1979 | Cook et al. | 353/72 X |
| 4,152,047 | 5/1979 | Inoue | 350/122 |

Primary Examiner—Harry N. Haroian
Attorney, Agent, or Firm—Lewis H. Eslinger; Alvin Sinderbrand

[57] ABSTRACT

A rear projection apparatus has a cabinet provided with a screen attaching portion, a rear projection screen attached to the screen attaching portion, an image projector for projecting an image onto the rear projecting screen from its back side, and a convex lens disposed at the back side of the rear projection screen, wherein the optical axis of the convex lens is shifted from its mechanical or dimensional center, and the convex lens is removably mounted to the rear projection screen so that the orientation of the lens relative to the screen can be altered whereby the light axis of the image from the rear projection screen is deflected to a predetermined direction by altering the orientation of the convex lens having the shifted optical axis in relation to the screen. The screen attaching portion of the cabinet permits altering the orientation of the lens and, thus, the direction in which the projected image is deflected, without increasing the size of the cabinet.

11 Claims, 7 Drawing Figures

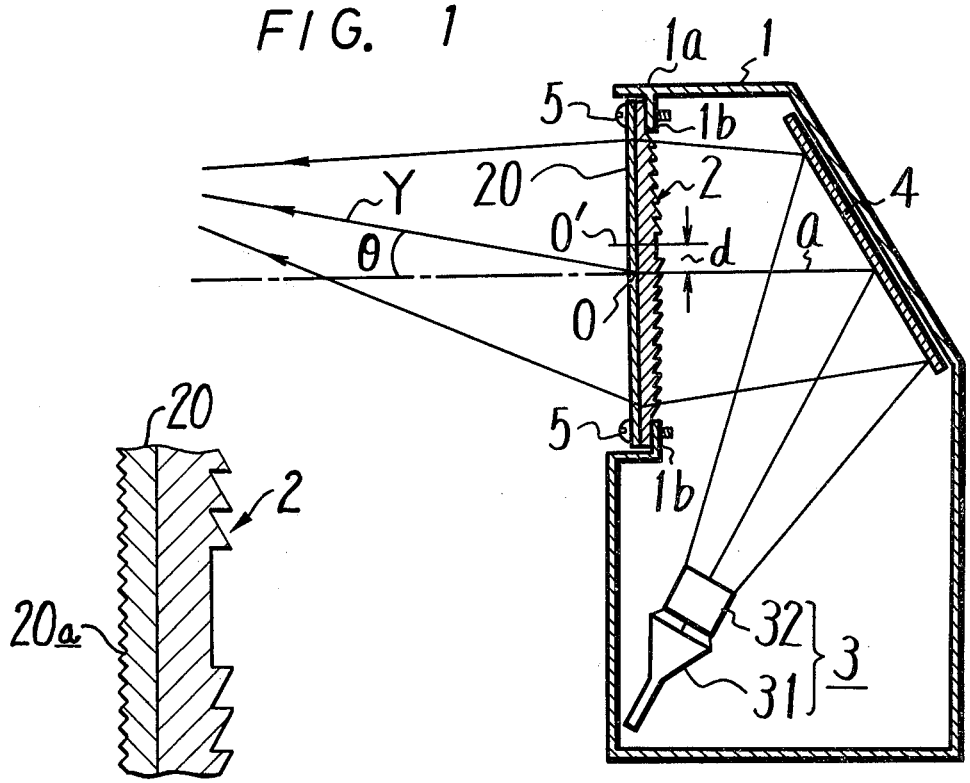
FIG. 1
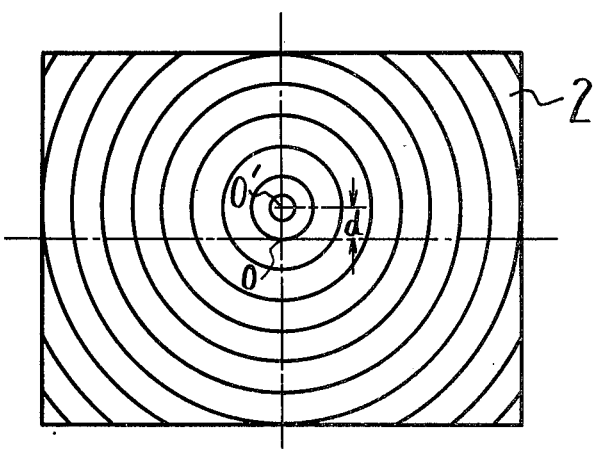
FIG. 7
FIG. 2

REAR PROJECTION APPARATUS

BACKGROUND OF THE INVENTION

1. Field of the Invention

The present invention relates generally to a rear projection apparatus in which an image is projected from the rear onto a screen, and is directed more particularly to a rear projection apparatus in which a convex lens, such as a Fresnel lens, is arranged so that its optical axis is eccentrically positioned in relation to the center of the screen.

2. Description of the Prior Art

In prior art rear projection apparatus of this kind, in order to utilize effectively the image light projected from a light source (light emitted from the phosphor of a cathode ray tube or the like), a lenticular screen is used to give different directivities to the projected light between the vertical and horizontal directions and a Fresnel lens to improve the luminance distribution are employed together. Further, the optical axis of the Fresnel lens is shifted from the picture center of a screen to change the direction of luminous flux to the viewer, or to converge the projected light to the viewer so that there is provided an optimum viewing area at which the viewer can enjoy a bright picture.

To this end, in the prior art rear projection apparatus of this kind, there is provided a mechanism to slidably move the Fresnel lens up and down and accordingly move its optical axis up, down and to thereby change the direction of the luminous flux emitted from the screen.

According to the prior art rear projection apparatus, however, it is required that the Fresnel lens must be made larger than the size of the screen by an amount at least equal to the amount that it is moved up and down. If the lens and screen were the same size and the optical axis of the lens were moved off the central axis of the screen, a portion of the screen would not have the benefit of the improved luminance distribution of the lens. This requires that there must be provided in the framework for attaching the screen a holding member that can slidably guide and support the larger Fresnel lens therein. Therefore, the cabinet of the rear projection apparatus naturally becomes unacceptably large in size.

OBJECTS AND SUMMARY OF THE INVENTION

Accordingly, it is an object of the present invention to provide a rear projection apparatus free from the defects encountered in the prior art.

It is another object of the invention to provide a rear projection apparatus in which light converging members such as a Fresnel lens, are formed having substantially the same size as the screen in size to permit its cabinet to be made small in size and, accordingly the apparatus can be made compact as a whole.

It is a further object of the invention to provide a rear projection apparatus in which the luminous flux can be converged in the direction of a viewer so that there can be presented an optimum viewing area for the viewer.

It is a yet further object of the invention to provide a rear projection apparatus, in which a Fresnel lens, whose optical axis has been previously shifted to a predetermined eccentric position in relation to the image center of the screen, is attached to the screen attaching portion of the rear projection apparatus in such a manner that their attaching position in the up-and down directions can be interchanged.

According to an aspect of the present invention, there is provided a rear projection apparatus which comprises:

(a) a cabinet having a screen attaching portion, (b) a rear projection screen attached to the screen attaching portion, (c) an image projecting device for projecting an image onto the rear projecting screen from the rear side, (d) a convex lens means disposed at the back side of the rear projection screen, characterized in that the optical center axis of the convex lens is shifted from the mechanical or dimensional center of the convex lens and the convex lens is attached to the rear projection screen in an interchangeable manner thereby a light axis of the image from the rear projection screen is deflected to a predetermined direction by changing the attaching direction of the convex lens in relation to the screen attaching portion of the cabinet.

The other objects, features, and advantages of the present invention will become apparent from the following description taken in conjunction with the accompanying drawings, throughout which like references designate the same elements and parts.

BRIEF DESCRIPTION OF THE DRAWINGS

FIG. 1 is a side view showing partially in cross-section an example of the rear projection apparatus according to the present invention in which the optical axis of a Fresnel lens is eccentrically shifted upwards;

FIG. 2 is an enlarged front view of the Fresnel lens shown in FIG. 1 to show a shifted position of the optical axis of the Fresnel lens;

FIG. 7 is an enlarged, fragmentary sectional view showing a portion of yet a modification of the embodiment of the invention shown on FIGS. 1, 2, 4 and 5.

DESCRIPTION OF THE PREFERRED EMBODIMENTS

Figure 3:
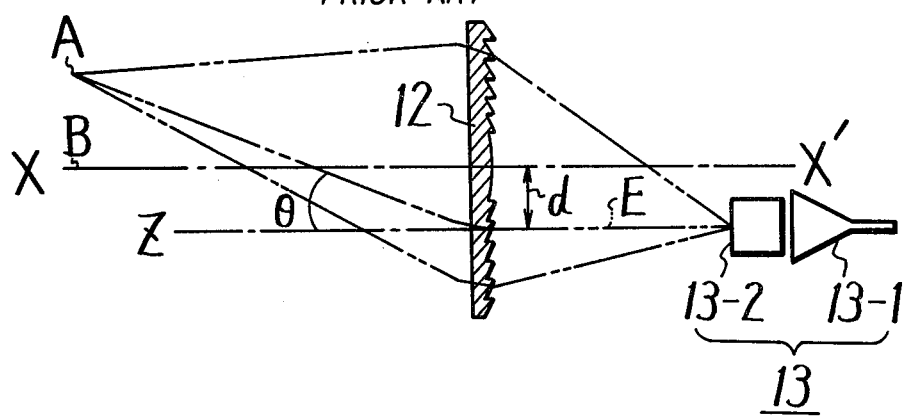
FIG. 3 is a schematic diagram partially in cross-section used to explain the effect carried out when the Fresnel lens is eccentrically shifted.

The present invention will be hereinbelow described with reference to the attached drawings.

An example of the rear projection apparatus according to the invention will be now described with reference to FIG. 1 in which a convex lens, such as a Fresnel lens, is attached to the cabinet of the real projection apparatus such that the optical axis of the Fresnel lens is shifted upwards from the center of the screen by a predetermined distance.

In FIG. 1, reference numeral 1 designates a cabinet of the rear projection apparatus. Cabinet 1 is provided with a screen attaching portion 1a to which is attached screen 20 that has a semitransparent diffusion face or a plurality of lenticular lenses formed on its front surface, as indicated at 20a on FIG. 7. A convex lens, such as a Fresnel lens, 2 is disposed on the back side of screen 20. Fresnel lens 2 is so constructed that, as shown in FIG.

2, its optical center 0' is shifted upwards from its mechanical or dimensional center 0 by a distance d. Further, Fresnel lens 2 is attached to screen attaching portion 1a in such a manner that its up and down orientation in relation to the screen attaching portion 1a can be inverted or interchanged. That is, Fresnel lens 2 and screen 20 are both fastened to frame 1b, which forms a part of screen attaching portion 1a, by means of screws 5. Thus, if screws 5 are loosened, Fresnel lens 2 and screen 20 can both be detached from frame 1b of screen attaching portion 1a or cabient 1, then their up and down positions are inverted or rotated by 90 degrees and, thereafter, they are reattached to cabinet 1 by screws 5.

As shown in FIG. 1, installed within cabinet 1 at its lower portion is projector 3 that consists of cathode ray tube 31 and projection lens means 32, also in cabinet 1 is located and at its rear portion obliquely upwards from the projector 3 is reflector or mirror 4. Thus, an image emitted or projected from projector 3 is reflected on reflector mirror 4 once, then passes through Fresnel lens 2 is and then projected on screen 20. In this case, the optical path from projector 3 to Fresnel lens 2 and, accordingly, screen 20 is elongated or lengthened so as to enlarge the light image. Additionally projector 3 is so fixed that its projection optical axis a is always perpendicular to Fresnel lens 2 and screen 20 and passes through the mechanical center 0 of screen 20 to prevent the projected image from being distorted.

When the light image thus projected passes through Fresnel lens 2, since the optical axis 0' of Fresnel lens 2 is shifted upwards from, that is above the mechanical or dimensional center 0 of screen 20 by the distance d, as shown in FIG. 2, the light image is refracted at Fresnel lens 2 in such a manner that the optical axis a of the light projected from projector 3 is directed upwards from the center of the optical field as determined by mirror A, a line along this center is shown by the one-dot chain line in FIG. 1, by an angle $\theta$, as shown by an optical axis line Y, to present an optimum viewing area above the mechanical center 0 of screen 20, as shown in FIG. 1.

The above theory will be now explained with reference to FIG. 3. First, when the projection optical axis of projector 13, which consists of cathode ray tube 13-1 and projection lens means 13-2, is coincident with an optical axis X—X' of Fresnel lens 12, the light projected from projector 13 is converged or focussed at a point B on the optical axis X—X' of Fresnel lens 12.

When projector 13 is shifted downwards such that a projection optical axis E of the light projected from projector 13 is parallel to the optical axis X—X' of Fresnel lens 12 but is spaced apart by a distance d, as shown in FIG. 3, the light or luminous flux emitted from the projector 13 is refracted at Fresnel lens 12 and propagates thereafter along a path intersecting the optical axis X—X' at an inclination angle $\theta$ and is then focussed at a point A above the optical axis X—X'. In other words, the projection optical axis E of the light emitted from projector 13 is refracted at Fresnel lens 12 and thereafter propagates upwardly intersecting at angle an $\theta$ to an extended line Z of the projection optical axis E, which is parallel to the optical axis X—X'.

The present invention utilizes the above theory to project a light image with a certain directivity.

Figure 4:
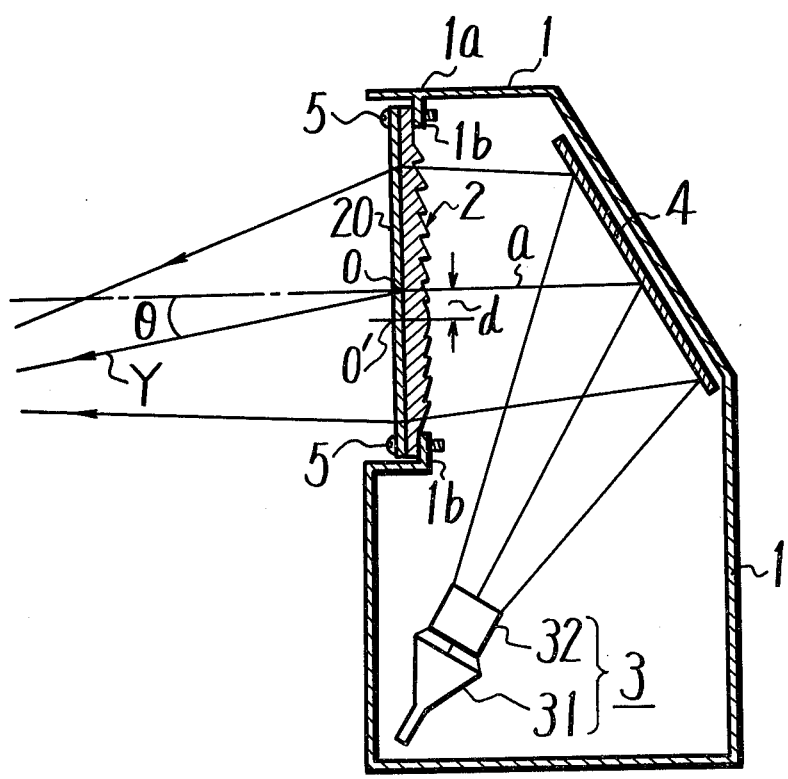
FIG. 4 is a schematic diagram showing such a case where the Fresnel lens is mounted so as to be interchanged from the direction shown in FIG. 1.
Figure 5:
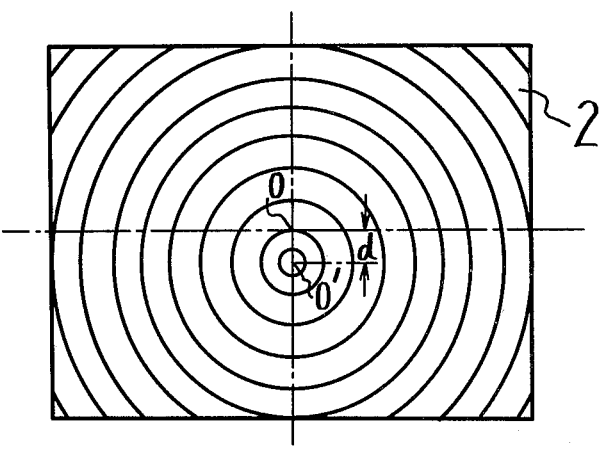
FIG. 5 is an enlarged front view of the Fresnel lens shown in FIG. 4.

As shown in FIGS. 4 and 5, when Fresnel lens 2 is attached to cabinet 1 under such a state that its up and down orientation is opposite to that shown in FIGS. 1 and 2, or the optical axis 0' of Fresnel lens 2 is shifted downward from or below mechanical center 0 of screen 20 by distance d, projection optical axis a of projector 3 is refracted at Fresnel lens 2 and directed downwards from the extended line of the optical axis a, as shown by the line Y, which intersects the projection optical axis a at the angle $\theta$. Thus, the entire light image is directed downwards so that the optimum viewing area is presented below the center of the screen 20.

In the examples of the invention shown in FIGS. 1 and 2, screen 20 and Fresnel lens 2 are formed separately. However, it may be possible to construct them integrally. For example, as shown in FIG. 6, the front surface of Fresnel lens 2 is provided with plural lenticular lenses to permit the front surface of Fresnel lens 2 to serve as the screen 20.

Figure 6:
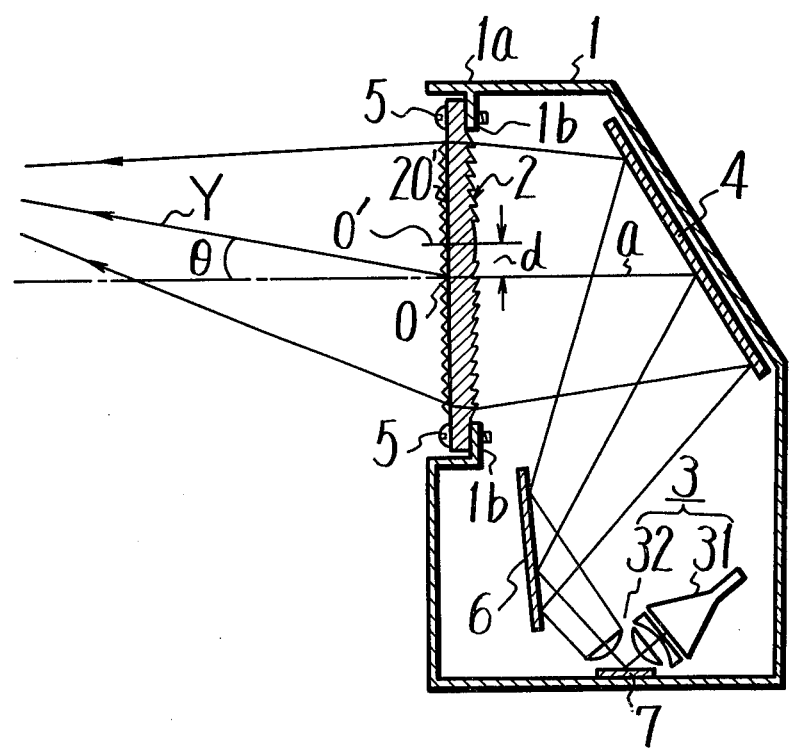
FIG. 6 is a side view showing partially in cross-section a further example of the invention.

Further, it may also be possible, as shown in FIG. 6, that a second mirror 6 can be located between projector 3 and mirror 4 within cabinet 1 and a third mirror 7 can be incorporated in the projection lens means 32.

Furthermore, it may also be possible that three cathode ray tubes, which emit red, green and blue color or primary color lights, respectively, can be used in which case projection lens means are located in front of the individual cathode ray tubes to compose respective color images on the screen as a composite color image.

Though not shown, it may be possible that the optical axis of the Fresnel lens is shifted from the mechanical center of the screen to a desired position either left or right in the horizontal direction and so on. For example, if the Fresnel lens, whose optical axis is previously shifted from the mechanical center of the screen in the horizontal direction, is reversed left to right direction and then reattached to the cabinet, the optimum viewing area can be presented at the left or right side from the mechanical center of the screen. Further, if the optical axis of the Fresnel lens is shifted from the mechanical center of the screen in an obtique or diagonal direction, the optimum viewing area can be realized at the upper or lower left or right, side in the oblique direction from the mechanical center of the screen. Furthermore, when the screen is substantially square, it may be possible that the Fresnel lens is removably attached to the cabinet with four degrees of freedom or up-and down directions and left and right directions, to present the optimum viewing area at a desired position in any of the four directions.

As described above, according to the rear projection apparatus of the present invention, the optical axis of the Fresnel lens is shifted with respect to the mechanical center of the screen, and the Fresnel lens is attached to the cabinet of the rear projection apparatus in such a manner that its attaching position to the cabinet can be changed for example, if it is ordinary for the viewer to watch an image on the screen of the rear projection apparatus from its upper side, the Fresnel lens is so attached to the cabinet that the optical axis of the Fresnel lens is positioned above the projection optical axis that is, the mechanical center of the screen. While, in another case if the viewer usually watches the screen from its lower side, the Fresnel lens can be attached to the cabinet such that the optical axis of the Fresnel lens is positioned below the projection optical axis.

Thus, according to the present invention problems of the prior art can be avoided, as in the case where the Fresnel lens must be moved up and down to adjust its optical axis so that, the cabinet must be made large in size in order to accomodate the location adjustments made to the large Fresnel lens. In this invention, a small or compact cabinet is sufficient to house the Fresnel lens, whose size is approximately the same as the screen, by using a Fresnel lens whose optical axis is shifted from the mechanical center of the screen that is changeably or removably attached to the cabinet in the direction to present the optimum viewing area at which the viewer can enjoy a bright and good picture wherein the offset of the Fresnel lens in relation to the center of the screen can be selectively set at a desired position.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A rear projection apparatus comprising:
a cabinet having a screen attaching portion;
a rear projection screen attached to said screen attaching portion and having a rear side with respect to a viewing position;
image projecting means for projecting an image onto said rear projecting screen from the rear side;
convex lens means disposed at said rear side of said rear projection screen, said convex lens means having an optical axis which is offset from a mechanical center of said convex lens means; and
means removably attaching said convex lens means to said screen attaching portion in various orientations relative to the latter with said optical axis of said lens means offset from a mechanical center of said rear projection screen, whereby a light axis of said image from said rear projection screen is deflected in a predetermined direction by changing the orientation of said convex lens means with respect to said screen attaching portion of said cabinet.

2. A rear projection apparatus according to claim 1, wherein said convex lens means is a Fresnel lens.

3. A rear projection apparatus according to claim 2, wherein said image projecting means includes at least one cathode ray tube and at least one projection lens means disposed in front of said cathode ray tube.

4. A rear projection apparatus according to claim 3 further comprising at least one mirror disposed between said rear projection screen and said projection lens.

5. A rear projection apparatus according to claim 2, wherein a plurality of lenticular lenses are formed on the front side of said rear projection screen.

6. A rear projection apparatus according to claim 2, wherein a plurality of lenticular lenses are formed directly on the front side of said Fresnel lens.

7. A rear projection apparatus having an image projecting system arranged in a cabinet, comprising: rear projection screen means; convex lens means having an optical axis offset from a mechanical axis; and means for effecting nonpermanent mounting of said screen means and said lens means in said cabinet for displaying a rear projected image, said lens means disposed behind said screen means in a first orientation, in which said optical axis of said lens means is offset from a mechanical axis of said screen means for deflecting an image of said screen means in a first direction, wherein said means for effecting nonpermanent mounting permits changing the mounting of said lens to at least a second orientation for deflecting the image of said screen means in at least a second direction.

8. A rear projection apparatus according to claim 7; in which said convex lens means comprises a Fresnel lens.

9. A rear projection apparatus according to claim 7; in which a plurality of lenticular lenses are formed on the side of said screen means of said screen means opposite the side on which said lens means is disposed.

10. A rear projection apparatus according to claim 7; in which said screen means comprises an outwardly facing surface of said lens means for displaying a rear projected image.

11. A rear projection apparatus according to claim 10; in which a plurality of lenticular lenses are formed on the side of said outwardly facing surface of said lens means.

* * * * *